(12) United States Patent
Krishnapura Subbaraya et al.

(10) Patent No.: US 10,733,433 B2
(45) Date of Patent: Aug. 4, 2020

(54) METHOD AND SYSTEM FOR DETECTING AND EXTRACTING A TABULAR DATA FROM A DOCUMENT

(71) Applicant: WIPRO LIMITED, Bangalore (IN)

(72) Inventors: Prashanth Krishnapura Subbaraya, Bengaluru (IN); Raghavendra Hosabettu, Bangalore (IN)

(73) Assignee: Wipro Limited, Bangalore (IN)

( * ) Notice: Subject to any disclaimer, the term of this patent is extended or adjusted under 35 U.S.C. 154(b) by 80 days.

(21) Appl. No.: 15/947,964

(22) Filed: Apr. 9, 2018

(65) Prior Publication Data
US 2019/0303663 A1    Oct. 3, 2019

(30) Foreign Application Priority Data

Mar. 30, 2018   (IN) .............................. 201841012053

(51) Int. Cl.
| | |
|---|---|
| *G06K 9/00* | (2006.01) |
| *G06K 9/46* | (2006.01) |
| *G06K 9/72* | (2006.01) |
| *G06N 20/00* | (2019.01) |

(52) U.S. Cl.
CPC ..... *G06K 9/00449* (2013.01); *G06K 9/00456* (2013.01); *G06K 9/00463* (2013.01); *G06K 9/46* (2013.01); *G06K 9/726* (2013.01); *G06N 20/00* (2019.01)

(58) Field of Classification Search
CPC ........... G06K 9/00449; G06K 9/00456; G06K 9/00463; G06K 9/46; G06K 9/726; G06N 20/00
See application file for complete search history.

(56) References Cited

U.S. PATENT DOCUMENTS

| | | |
|---|---|---|
| 5,956,422 A | 9/1999 | Alam |
| 9,495,347 B2 | 11/2016 | Stadermann et al. |
| 2006/0288268 A1 | 12/2006 | Srinivasan et al. |
| 2009/0259995 A1 | 10/2009 | Inmon |

OTHER PUBLICATIONS

Aumann et al, "Visual information extraction", 2006, Knowl Inf Syst (2006) 10(1), 15 pages (Year: 2006).*
Oro et al, "PDF-TREX: An Approach for Recognizing and Extracting Tables from PDF Documents", 2009, 10th International Conference on Document Analysis and Recognition, pp. 906-910 (Year: 2009).*
Klampfl, S., et al., "A Comparison of Two Unsupervised Table Recognition Methods from Digital Scientific Artificial", D-Lib Magazine (2014), p. 1-13.

* cited by examiner

*Primary Examiner* — David F Dunphy
(74) *Attorney, Agent, or Firm* — Finnegan, Henderson, Farabow, Garrett & Dunner, LLP (57) ABSTRACT

This disclosure relates generally to document processing, and more particularly to method and system for detecting and extracting tabular data from a document. In one embodiment, the method may include generating a hierarchy of features, for a plurality of features of an image document derived from the document, based on relative spatial properties of the plurality of features. The method may further include segmenting the image document into a plurality of semantic segments based on the hierarchy of features, classifying each of the plurality of semantic segments into at least one of a plurality of tabular structures, and effecting at least one of a detection or an extraction of the tabular data from the image document based on the classification.

17 Claims, 5 Drawing Sheets

METHOD AND SYSTEM FOR DETECTING AND EXTRACTING A TABULAR DATA FROM A DOCUMENT

TECHNICAL FIELD

This disclosure relates generally to document processing, and more particularly to method and system for detecting and extracting tabular data from a document.

BACKGROUND

A wide variety of applications may require processing of documents to perform contextual data interpretation. As will be appreciated, document processing may typically involve conversion of a paper or electronic document into electronic information (that is, data) that may be worked upon. Further, as will be appreciated, in many digital documents (for example, financial reports, product documents, scientific articles, or the like), the data may be presented in tabular structures (rows and columns) for facilitating ease of presentation and interpretation. For example, such tabular structures may allow an author of a document to present information in a structured manner so as to summarize and communicate key results. Further, such tabular structures may enable readers of the document to get a quick overview of the presented information and to compare them with other similar information in a specific context. Additionally, the tabular formats are increasingly used by analysts for data mining, information retrieval, trend analysis and other tasks. It is, therefore, necessary to detect and extract such tabular data from the document for further processing, such as for contextual data interpretation.

However, such detection and extraction of tabular data from a document may be challenging due to a large variability in tabular structure layouts, tabular structure styles, information type and format in the tabular structure, and further due to a lack of standard document formats. For example, while data is presented in the tabular formats, the heights of rows and columns may be different, cells may have been merged (that is, each row may not have same number of column or each column may not have same number of rows), the borders of table and lines distinguishing the cells may be different, the cells may be distinguished by various colors and background patterns rather than lines, the table may include nested tables with multiple table headers, tables may be arranged in a hierarchical order, and so forth.

Existing techniques provide for tabular data detection and extraction using partitioning, clustering of words inside tables, boundary detection, set of pre-developed rules, scoring techniques, annotation, and so forth. However, existing techniques for identification and extraction of tabular data and other such related tasks are limited in their effectiveness, robustness, and efficiency due to their inability to deal with a vast variation in the formats and structures of the tabular data.

SUMMARY

In one embodiment, a method for detecting and extracting tabular data from a document is disclosed. In one example, the method may include generating a hierarchy of features, for a plurality of features of an image document derived from the document, based on relative spatial properties of the plurality of features. The method may further include segmenting the image document into a plurality of semantic segments based on the hierarchy of features. The method may further include classifying each of the plurality of semantic segments into at least one of a plurality of tabular structures. The method may further include effecting at least one of a detection or an extraction of the tabular data from the image document based on the classification.

In one embodiment, a system for detecting and extracting tabular data from a document is disclosed. In one example, the system may include a document processing device, which may include at least one processor and a memory communicatively coupled to the at least one processor. The memory may store processor-executable instructions, which, on execution, may cause the processor to generate a hierarchy of features, for a plurality of features of an image document derived from the document, based on relative spatial properties of the plurality of features. The processor-executable instructions, on execution, may further cause the processor to segment the image document into a plurality of semantic segments based on the hierarchy of features. The processor-executable instructions, on execution, may further cause the processor to classify each of the plurality of semantic segments into at least one of a plurality of tabular structures. The processor-executable instructions, on execution, may further cause the processor to effect at least one of a detection or an extraction of the tabular data from the image document based on the classification.

In one embodiment, a non-transitory computer-readable medium storing computer-executable instructions for detecting and extracting tabular data from a document is disclosed. In one example, the stored instructions, when executed by a processor, may cause the processor to perform operations including generating a hierarchy of features, for a plurality of features of an image document derived from the document, based on relative spatial properties of the plurality of features. The operations may further include segmenting the image document into a plurality of semantic segments based on the hierarchy of features. The operations may further include classifying each of the plurality of semantic segments into at least one of a plurality of tabular structures. The operations may further include effecting at least one of a detection or an extraction of the tabular data from the image document based on the classification.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
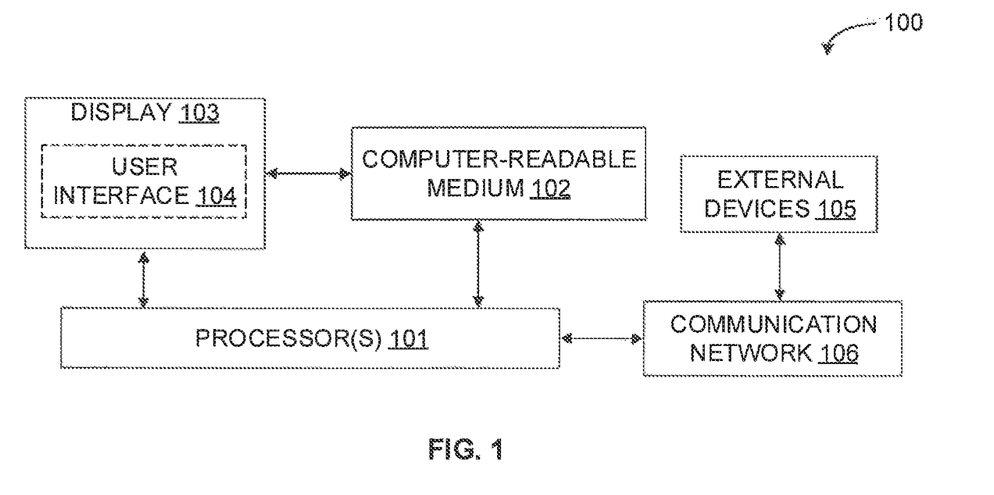
FIG. 1 is a block diagram of an exemplary system for detecting and extracting tabular data from a document, in accordance with some embodiments of the present disclosure.

Referring now to FIG. 1, an exemplary system 100 for detecting and extracting tabular data from a document is illustrated in accordance with some embodiments of the present disclosure. The system 100 may include a computing device having a document processing capability. For example, the system 100 may include, but may not be limited to, server, desktop, laptop, notebook, netbook, tablet, smartphone, mobile phone, or the like. In particular, the system 100 implements a document processing device so as to detect and extract the tabular data from the document. As will be described in greater detail in conjunction with FIGS. 2-5, the document processing device may generate a hierarchy of features, for a plurality of features of an image document derived from the document, based on relative spatial properties of the plurality of features. Further, the document processing device may segment the image document into a plurality of semantic segments based on the hierarchy of features. Further, the document processing device may classify each of the plurality of semantic segments into at least one of a plurality of tabular structures. Further, the document processing device may effect at least one of a detection or an extraction of the tabular data from the image document based on the classification.

The system 100 may include one or more processors 101, a computer-readable medium (e.g., a memory) 102, and a display 103. The computer-readable storage medium 102 may store instructions that, when executed by the one or more processors 101, cause the one or more processors 101 to detect and extract tabular data from the document in accordance with aspects of the present disclosure. The computer-readable storage medium 102 may also store various data (e.g., document, image document, features and their spatial properties, hierarchy of features, semantic segments, tabular structures, machine learning model, spatial information derived from the hierarchy of features, semantic information corresponding to semantic segments, etc.) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but are not limited to, a remote server, a digital device, or another computing system.

Figure 2:
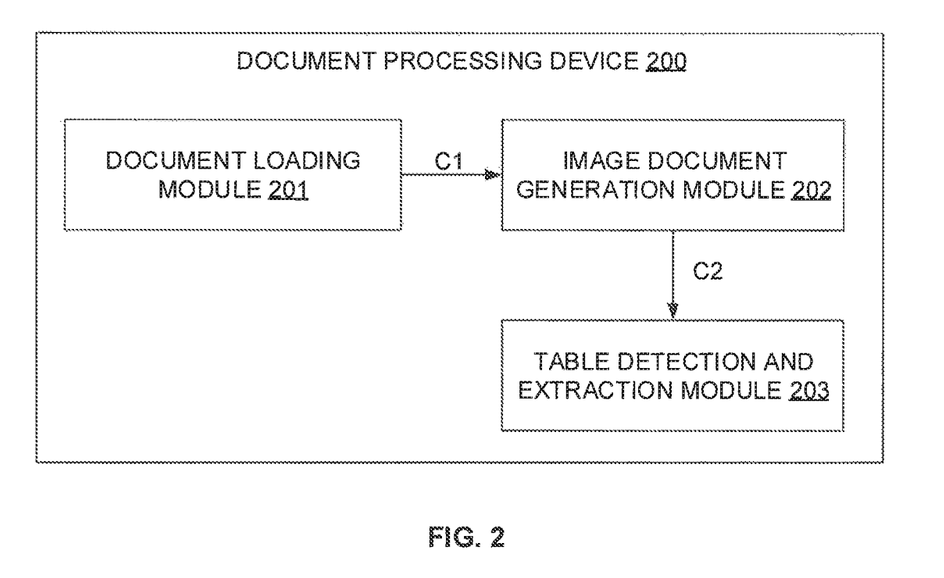
FIG. 2 is a functional block diagram of a document processing device, implemented by the system of FIG. 1, in accordance with some embodiments of the present disclosure.

Referring now to FIG. 2, a functional block diagram of the document processing device 200, implemented by the system 100 of FIG. 1, is illustrated in accordance with some embodiments of the present disclosure. The document processing device 200 may include various modules that perform various functions so as to detect and extract the tabular data from the document. In some embodiments, the document processing device 200 may include a document loading module 201, an image document generation module 202, and a table detection and extraction module 203. As will be appreciated by those skilled in the art, all such aforementioned modules 201-203 may be represented as a single module or a combination of different modules. Moreover, as will be appreciated by those skilled in the art, each of the modules 201-203 may reside, in whole or in parts, on one device or multiple devices in communication with each other.

The document loading module 201 may receive documents that need to be processed by the document processing device 200 from one or more sources. For example, in some embodiments, the document loading module 201 may receive a document directly from an input device (e.g., scanner, camera, or the like) or an external device (e.g., smartphone, or the like). Additionally, in some embodiments, the document loading module 201 may receive the document uploaded by a user via the user interface. The document may be an image document or a text document and may include tabular data in varying format and layout. The image document may include, but may not be limited to, a portable document format (.pdf), a joint photographic experts group format (.jpg or .jpeg), a tagged image file format (.tiff or .tif), a bitmap image file format (.bmp), a graphics interchange format (.gif), and a PNG format (.png).

The image document generation module 202 may receive the document from the document loading module 201 via a connection C1. The image document generation module 202 may then split the document into a number of sub-documents such that each sub-document may correspond to a page of the document. The image document generation module 202 may then convert each of the sub-documents into the image document. In some embodiments, the image document may be of a suitable dimension (that is, an appropriate size) and a suitable resolution (that is, with an appropriate dots per inch (dpi)). It should be noted that, in such embodiments, the dimension and the resolution of the image document suitable for subsequent processing by the table detection and extraction module 203 may be pre-defined by the user or by the document processing device 200. Thus, each page of the document may be split into an image document of the pre-defined dimension and the pre-defined resolution. As will be appreciated, the splitting may enable the document processing device 200 to modularize the incoming content for simplified data processing.

The table detection and extraction module 203 may receive the image document from the image document generation module 202 via a connection C2. The table detection and extraction module 203 may detect the tabular data in the image document, and may extract the detected tabular data from the image document. As will be appreciated, the table detection and extraction module 203 may be first trained for identification of tables and tabular data. In some embodiments, the training may be a supervised training of a machine learning model using training data, which may include a number of image documents and corresponding desired outputs (for example, identified or marked tabular data). Upon training, the table detection and extraction module 203 may detect and extract tables from the newly received image documents.

The table detection and extraction module 203 may generate a hierarchy of features, for a number of features present in the image document. It should be noted that the features may include, but may not be limited to, edges in the image document, contrasts in the image document, borders of the tabular structure, pixel densities in the image document, gradient difference in colors in the image document, spacing (that is, white spaces) between words in the image document, alignment of pixels in the image document, or the like. The hierarchy of features may be generated based on relative spatial properties (that is, direction of lines, number of pixels, coordinates of individual pixels, values of pixels, or the like) of the features. In some embodiments, the table detection and extraction module 203 may employ a machine learning model so as to generate the hierarchy of features. It should be noted that the hierarchy of features may be a combination of one or more features of a portion of the image document that may provide a meaningful information about that portion of the image document. For example, an existence of borders along with pixel density may indicate an existence of a tabular structure. As will be appreciated, the hierarchy of may organize the information from a lower level of information to a higher level of information. For example, in some embodiments, individual features may form the lowest level of the hierarchy of the feature, followed by a first level of combination of features that may indicate a cell of the tabular structure, followed by a second level of combination of features that may indicate a row or a column of the tabular structure, followed by a highest level of combination of features that may indicate the tabular structure itself.

The table detection and extraction module 203 may then generate a number of semantic segments from the image document based on the hierarchy of features. It should be noted that the semantic segments may include a segment of the image document along with one or more neighboring segments of the image document. As will be appreciated, an individual segment, in itself, may not provide a meaningful contextual information with respect to that segment. However, a meaningful contextual information may be derived when such segment is considered along with its neighboring segments. The table detection and extraction module 203 may then detect the tables based on the generated semantic segments. In particular, the table detection and extraction module 203 may classify each of the semantic segments into at least one of a tabular structures. As will be appreciated, in some embodiments, the classification may be performed based on the training provided to the table detection and extraction module 203. Thus, if the machine learning model has been trained to perform binary classification (that is, if the semantic segments represent a tabular structure or not) during the training phase, the model may classify the semantic segments into such binary classification during the operational phase. It should be noted that the tabular structures may include, but may not be limited to, a table border, a table structure, a nested table structure, a multi-level header, a cell, a row, and a column. The table detection and extraction module 203 may further effect a detection or an extraction of the tabular data from the image document based on the classification.

As will be appreciated, each of the connections, C1-C2, may acquire or transfer document or image document from one module 201-203 to the other module or the database 201-203 using standard wired or wireless data connections means. For example, each of the connections, C1-C2, may employ one or more connection protocols including, but not limited to, serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, and PCIe.

By way of an example, the document processing device 200 described above may automatically detect and extract tabular data (for example, tables, nested tables, multi-level headers, nested cell detection, or the like) from the document, based on semantic segments generated from the document feature hierarchies. In particular, the document processing device 200 may detect cell, row and column based on structural properties of their relative segments by using semantical segments generated from the feature hierarchies. Further, the document processing device 200 may split the input document into multiple image documents, and each image document may be semantically segmented based on the feature hierarchies generated by the machine learning model.

As will be appreciated, unlike existing techniques, the document processing device 200 described above may not use specific rules to derive identification, extraction, interpretation, and standardization so as to detect tables or extract tabular data. Further, unlike existing techniques, the document processing device 200 described above may not perform table scoring for each of the table candidates so as to select table from detected candidates. As discussed above, the document processing device 200 may employ semantical segments generated from the hierarchy of features for detecting and extracting the tabular data from the document.

It should be noted that the document processing device 200 may be implemented in programmable hardware devices such as programmable gate arrays, programmable array logic, programmable logic devices, or the like. Alternatively, the document processing device 200 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

As will be appreciated by one skilled in the art, a variety of processes may be employed for detecting and extracting tabular data from a document. For example, the exemplary system 100 and the associated document processing device 200 may perform detection and extraction of the tabular data from the document by the processes discussed herein. In particular, as will be appreciated by those of ordinary skill in the art, control logic and/or automated routines for performing the techniques and steps described herein may be implemented by the system 100 and the associated document processing device 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 3:
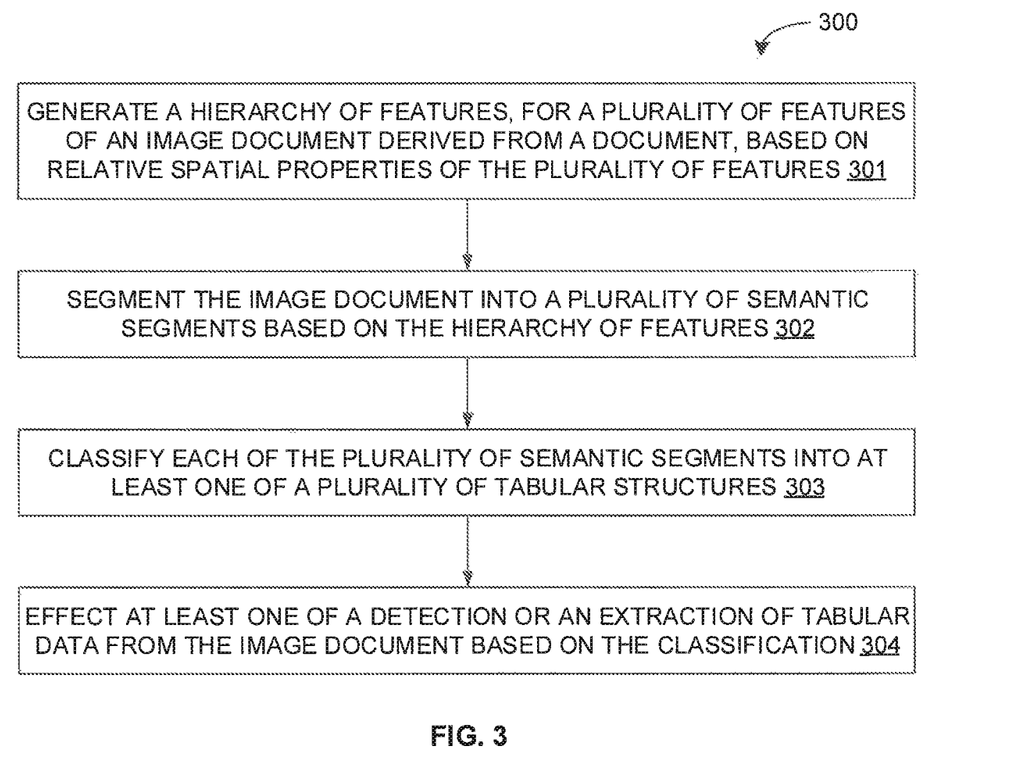
FIG. 3 is a flow diagram of an exemplary process for detecting and extracting tabular data from a document, in accordance with some embodiments of the present disclosure.

For example, referring now to FIG. 3, exemplary control logic 300 for detecting and extracting tabular data from a document via a system, such as system 100, is depicted via a flowchart in accordance with some embodiments of the present disclosure. As illustrated in the flowchart, the control logic 300 May include the step of generating a hierarchy of features, for a plurality of features of an image document derived from the document, based on relative spatial properties of the plurality of features at step 301. The control logic 300 may further include the steps of segmenting the image document into a plurality of semantic segments based on the hierarchy of features at step 302, and classifying each of the plurality of semantic segments into at least one of a plurality of tabular structures at step 303. The control logic 300 may further include the step of effecting at least one of a detection or an extraction of the tabular data from the image document based on the classification at step 304. In some embodiments, the control logic 300 may further include the steps of receiving the document, splitting the document into a plurality of sub-documents corresponding to a plurality of pages of the document, and converting each of the plurality of sub-documents into the image document.

In some embodiments, generating the hierarchy of features at step 301 may include the step of generating the hierarchy of features using a machine learning model. Additionally, in such embodiments, generating the hierarchy of features at step 301 may include the step of enhancing the plurality of features using the machine learning model. Further, in some embodiments, segmenting the image document at step 302 may include the step of segmenting the image document based on a spatial information obtained from the hierarchy of features. Moreover, in such embodiments, segmenting the image document at step 302 may include the step of deriving a semantic information for each of the plurality of semantic segments by correlating higher level information from the hierarchy of features with lower level information from the hierarchy of features.

In some embodiments, classifying each of the plurality of semantic segments at step 303 may include the step of classifying each of the plurality of semantic segments based on a spatial information for each of the plurality of semantic segments. Further, in some embodiments, the plurality of tabular structures may include at least one of a table border, a table structure, a nested table structure, a multi-level header, a cell, a row, or a column.

Figure 4:
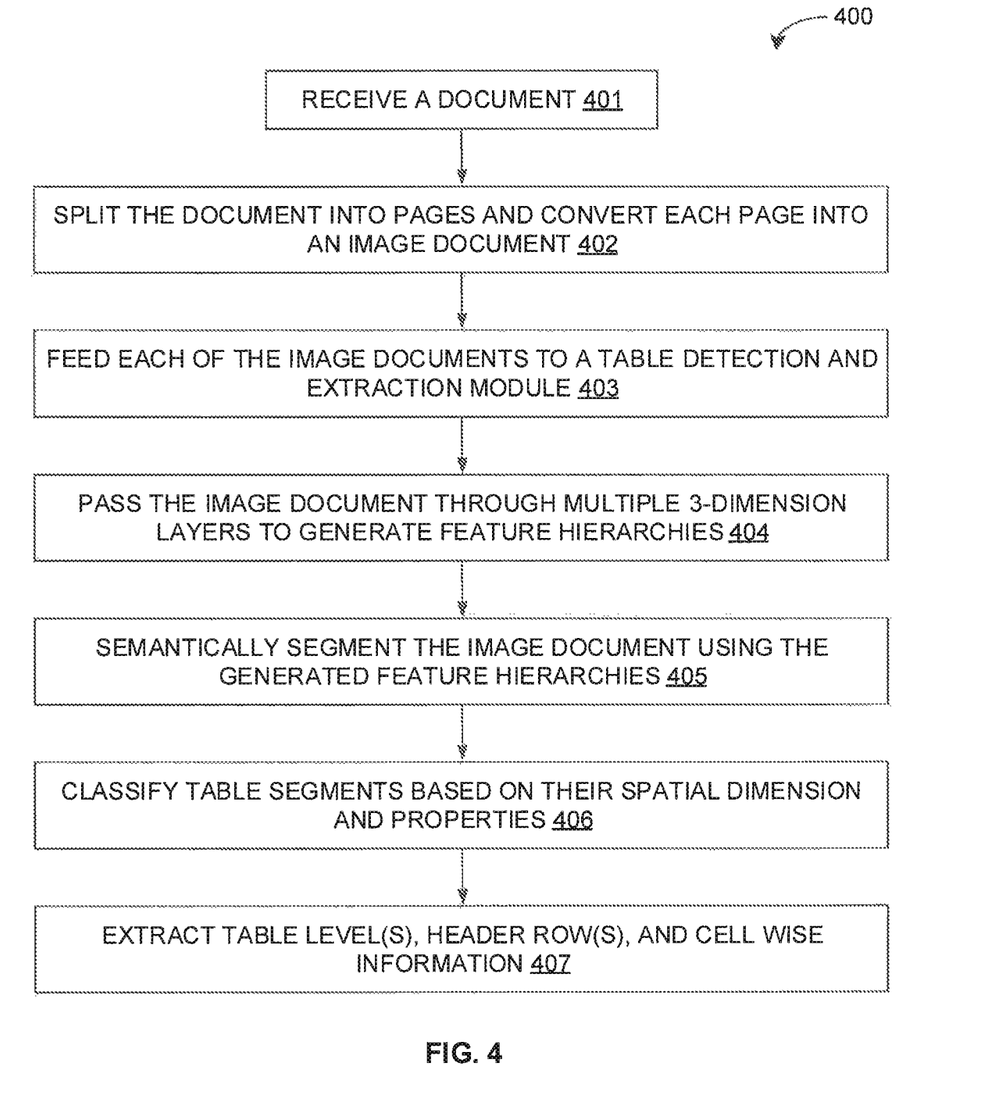
FIG. 4 is a flow diagram of a detailed exemplary process for detecting and extracting tabular data from a document, in accordance with some embodiments of the present disclosure.

Referring now to FIG. 4, exemplary control logic 400 for detecting and extracting tabular data from a document based on semantic segments generated from the document feature hierarchies is depicted in greater detail via a flowchart in accordance with some embodiments of the present disclosure. As illustrated in the flowchart, at step 401, the control logic 400 may receive the document. For example, in some embodiments, the document, such as a financial invoice document, to be checked against tabular data for information extraction may be loaded in to the system 100. At step 402, the control logic 400 may split the document into pages and convert each page into an image. Thus, the document loaded in the system 100 may be split and converted into image documents. In some embodiments, each page in the document may be converted to an image document with a minimum dpi pre-defined by the system 100 (for example, 100 dpi or 300 dpi). As will be appreciated, these image documents may contain different types of tables.

At step 403, the control logic 400 may feed each of the image documents to a table detection and extraction module 203 for subsequent processing. As discussed above, the table detection and extraction module 203 may follow a three step approach for detection and extraction of the tabular data in the image document. First, the table detection and extraction module 203 may generate a hierarchy of features by processing the image document. Second, the table detection and extraction module 203 may perform semantic segmentation of the image document based on the hierarchy of features. Third, the table detection and extraction module 203 may classify each of the semantic segments for detecting the tabular data.

Thus, at step 404, the control logic 400 may pass the image document through a multi-layer machine learning network. These layers may contain the spatial information in a 3-dimensional array. The first few layers in the network (that is, feature hierarchy generation layer) may enhance the features and generate the feature hierarchy. Thus, after each layer, the number of features may be enhanced and the hierarchy of features may be generated based on their relative spatial properties. In short, the control logic 400 may pass the image document through multiple 3-dimension layers so as to generate feature hierarchies. The generated feature hierarchies may then be used by the next set of layers (that is, segmentation layer) to segment the image document.

Additionally, at step 405, the control logic 400 may semantically segment the image document using the generated feature hierarchies. As will be appreciated, the image document may be segmented based on the spatial information obtained from the feature hierarchy. In some embodiments, the semantic segments may be formed by combining the higher level information with the lower level information in the feature hierarchy so as to build the semantics of the segments. It should be noted that the fusing of layers may enable the algorithm to learn fine level of semantics and the spatial information with a greater accuracy. This semantical segment information may then be passed to the next set of layers (that is, classifier layer) in order to classify all the table segments in the image document.

Further, at step 406, the control logic 400 may classify table segments based on their spatial dimension and properties. The segments and their spatial and semantic information may be used by the last few layers so as to classify the tabular data in the image document. The segments may be divided based on the relative spatial information of the output and their semantical properties. Further, each segment may be up-sampled so as to get a higher precision in the output. Using the above information, the segments may classified to get the tables in the image documents. In some embodiments, the header and the cells may be detected in each table, and the output may be provided in a JSON format. In some embodiments, there may be a nested table in the document. These nested tables may also be classified based on the training. Further, in some embodiments, the model may support detecting and classifying multi-level headers in the document. At step 407, the control logic 400 may extract table level(s), header row(s), and cell wise information from the image document based on the classification.

Figure 5:
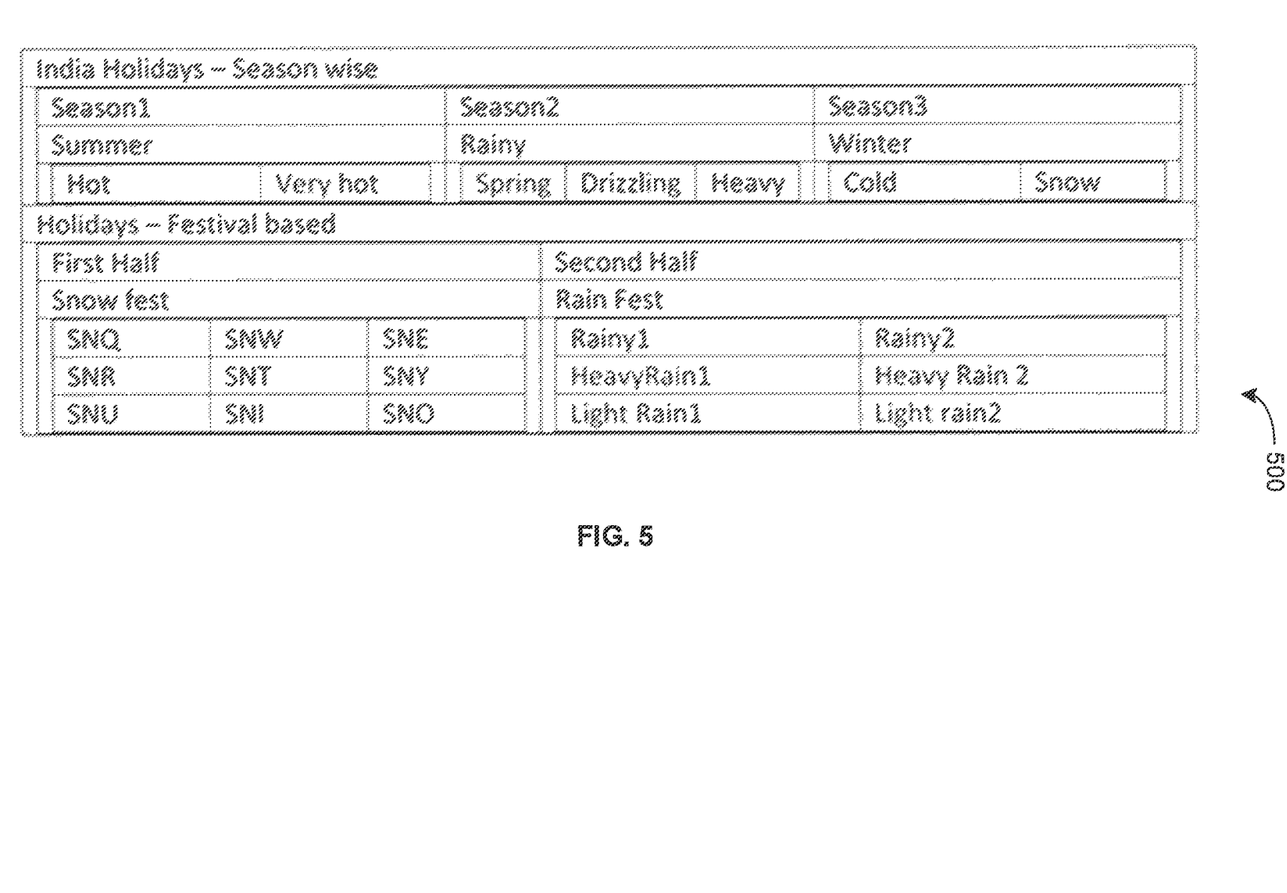
FIG. 5 illustrate an exemplary image document from which tabular data may be detected and extracted by the system of FIG. 1, in accordance with some embodiments of the present disclosure.

Referring now to FIG. 5, an exemplary image document, from which tabular data may be detected and extracted by the system of FIG. 1 in accordance with some embodiments of the present disclosure, is illustrated. The image document 500 may include 2 nested tables—one with the title 'India Holidays—Season wise' and another with the title 'Holidays—Festival based'. The image document 500 may be fed to the table detection and extraction module 203 of the system 100. As stated above, unlike the existing techniques that may detect a single table in the image document 500, the table detection and extraction module 203 may detect both the tables in the image document 500. In particular, the table detection and extraction module 203 may generate the hierarchy of features for the image document 500. The hierarchy of features, in the image document 500, may include multiple levels. The base level or the lowest level may have individual features such as lines, number of pixels, edges, background color gradient, and so forth. The next levels or higher levels may include combination of one or more individual features such as number of horizontal lines between two regions of text, number of vertical lines between two regions of text, spacing between two words, and so forth. As discussed above, multiple features may be combined using relative special properties of the multiple features. Thus, for example, in the image document 500, the hierarchy of features may be built based on a relative spacing between a header and a cell, a relative spacing between a cell and a neighboring vertical border line, a relative spacing between two characters, or other such spatial properties. Further, for example, the horizontal borders and the vertical borders may be combined using the relative spacing among them.

The hierarchy of features may be subsequently employed to detect and extract the tabular data from the image document 500. For example, the hierarchy of features may be employed to differentiate the tabular cells in the image document 500. In particular, as discussed above, the table detection and extraction module 203 may segment the image document 500 into a number of semantic segments based on the hierarchy of features, and classify the semantic segments into one or more of the tabular structure using a trained machine learning model. Further, the table detection and extraction module 203 may detect nested tables, tables without proper boundaries, tables in which cells may be differentiated with just colors, or the like based on the classification.

By way of example, the system 100 may split an incoming document into multiple image documents for easy processing, generate a feature hierarchy based on their relative spatial properties using multi-layer machine learning network, classify the table segments using semantic segmentation based on the feature hierarchy, and detect the table borders, structures, nested table structure, multi-level headers, or the like. Additionally, the system 100 may provide the extracted tabular data to the user or another system.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
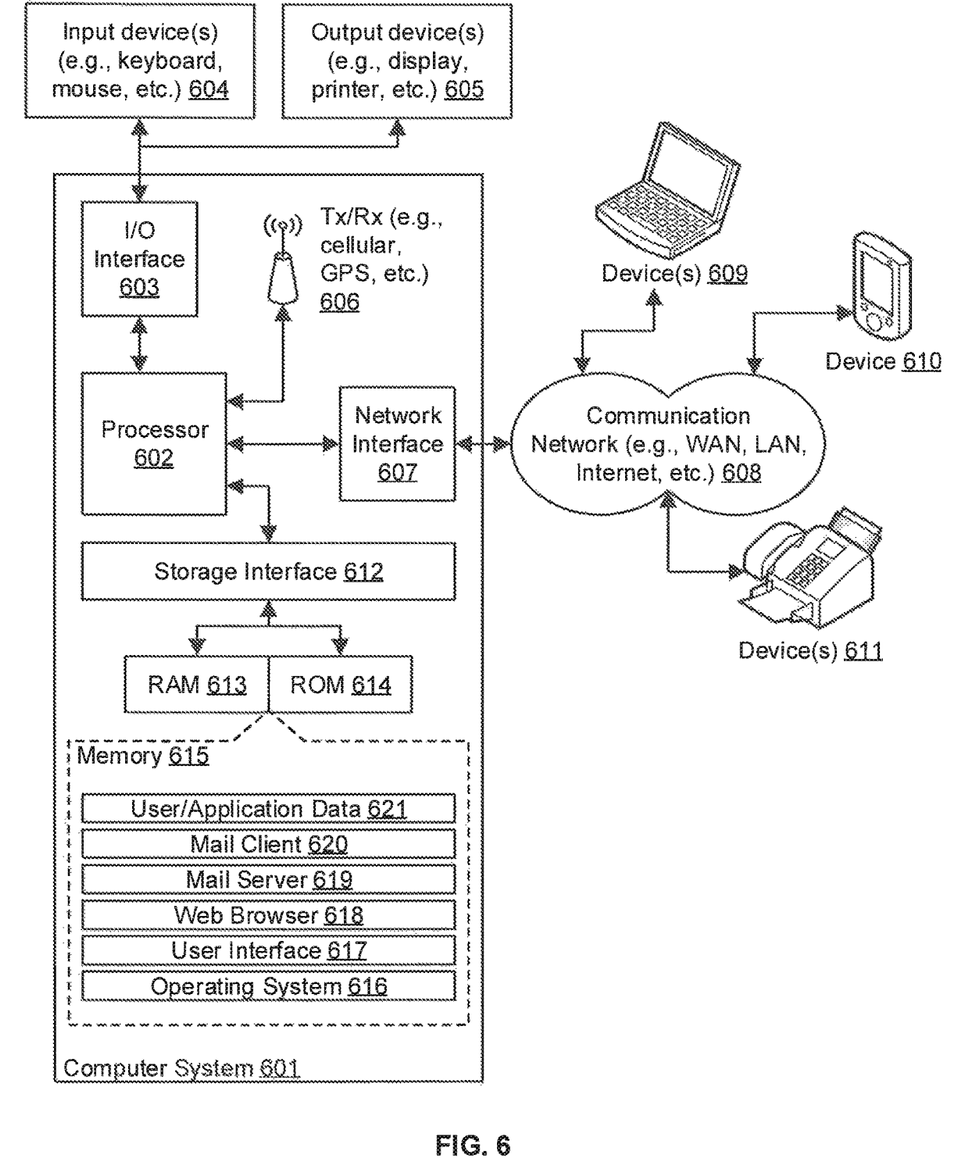
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100 for detecting and extracting tabular data from a document. Computer system 601 may include a central processing unit ("CPU" or "processor") 602. Processor 602 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interlace 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, 12C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 601 may implement a web browser 618 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 601 may implement a mail server 619 stored program component. The mail server may be an Internet mail server such as MICROSOFT® EXCHANGE®, or the like. The mail server may utilize facilities such as ASP, ActiveX, ANSI C++/C #, MICROSOFT.NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 601 may store user/application data 621, such as the data, variables, records, etc. (e.g., document, image document, features and their spatial properties, hierarchy of features, semantic segments, tabular structures, machine learning model, spatial information derived from the hierarchy of features, semantic information corresponding to semantic segments, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide an effective, robust, and efficient mechanism for detecting and extracting a tabular data from a document. The techniques provide for detection and extraction of tabular data using semantical segments generated from the feature hierarchy. It should be noted that such approach provides for a better accuracy than the traditional rule based approaches. Additionally, such approach is independent of the table structure and able to detect heterogeneous tables in a document. In contrast, the rule based or score based approaches need proper table structure for the detection of the table.

Further, as will be appreciated by those skilled in the art, the techniques described in the various embodiments discussed above provide for detection and extraction of complex tables such as nested tables, multi-level headers, table without borders, and so forth. It should be noted that the techniques discussed above is a scalable and invariant of position and size of the table. Moreover, the techniques may be easily deployed in any cloud based servers so as to provide a cloud based service. For example, the techniques may be employed as a cloud based application, such as, mobile device application.

The specification has described method and system for detecting and extracting tabular data from a document. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of detecting and extracting tabular data from a document, the method comprising:
   generating, by a document processing device, a hierarchy of features, for a plurality of features of an image document derived from the document, based on relative spatial properties of the plurality of features;
   segmenting, by the document processing device, the image document into a plurality of semantic segments based on the hierarchy of features, wherein segmenting the image document comprises:
      deriving semantic information for each of the plurality of semantic segments by correlating higher level information with lower level information associated with the hierarchy of features,
         wherein the higher level information includes combination of one or more individual features selected from a group consisting of: number of horizontal lines between two regions of text, number of vertical lines between the two regions of text, and spacing between any two texts, and
         wherein the lower level information includes lines, number of pixels, edges, and background color gradient in the image document;
   classifying, by the document processing device, each of the plurality of semantic segments into a plurality of tabular structures based on structural properties of each target semantic segment along with one or more neighboring semantic segments that provide a meaningful contextual information with respect to that target segment; and
   effecting, by the document processing device, at least one of a detection or an extraction of the tabular data from the image document based on the classification.

2. The method of claim 1, further comprising:
   receiving the document;
   splitting the document into a plurality of sub-documents corresponding to a plurality of pages of the document; and
   converting each of the plurality of sub-documents into the image document.

3. The method of claim 1, wherein generating the hierarchy of features comprises generating the hierarchy of features using a machine learning model.

4. The method of claim 3, wherein generating the hierarchy of features further comprises enhancing the plurality of features using the machine learning model.

5. The method of claim 1, wherein segmenting the image document further comprises segmenting the image document based on spatial information obtained from the hierarchy of features.

6. The method of claim 1, wherein classifying each of the plurality of semantic segments further comprises classifying each of the plurality of semantic segments based on spatial information for each of the plurality of semantic segments.

7. The method of claim 1, wherein the plurality of tabular structures comprises a table border, a table structure, a nested table structure, a multi-level header, a cell, a row, and a column.

8. A system for detecting and extracting tabular data from a document, the system comprising:
   a document processing device comprising at least one processor and a computer-readable medium storing instructions that, when executed by the at least one processor, cause the at least one processor to perform operations comprising:
      generating a hierarchy of features, for a plurality of features of an image document derived from the document, based on relative spatial properties of the plurality of features;
      segmenting the image document into a plurality of semantic segments based on the hierarchy of features, wherein segmenting the image document comprises:
         deriving semantic information for each of the plurality of semantic segments by correlating higher level information with the lower level information associated with the hierarchy of features,
            wherein the higher level information includes combination of one or more individual features selected from a group consisting of: number of horizontal lines between two regions of text, number of vertical lines between the two regions of text, and spacing between any two texts, and wherein the lower level information includes lines, number of pixels, edges, and background color gradient in the image document;

classifying each of the plurality of semantic segments into a plurality of tabular structures based on structural properties of each target semantic segment along with one or more neighboring semantic segments that provide a meaningful contextual information with respect to that target segment; and effecting at least one of a detection or an extraction of the tabular data from the image document based on the classification.

9. The system of claim 8, wherein the operations further comprise:

receiving the document;

splitting the document into a plurality of sub-documents corresponding to a plurality of pages of the document; and converting each of the plurality of sub-documents into the image document.

10. The system of claim 8, wherein generating the hierarchy of features comprises generating the hierarchy of features using a machine learning model.

11. The system of claim 10, wherein generating the hierarchy of features further comprises enhancing the plurality of features using the machine learning model.

12. The system of claim 8, wherein segmenting the image document further comprises segmenting the image document based on spatial information obtained from the hierarchy of features.

13. The system of claim 8, wherein classifying each of the plurality of semantic segments further comprises classifying each of the plurality of semantic segments based on spatial information for each of the plurality of semantic segments.

14. The system of claim 8, wherein the plurality of tabular structures comprises a table border, a table structure, a nested table structure, a multi-level header, a cell, a row, and a column.

15. A non-transitory computer-readable storage medium having stored thereon, a set of computer-executable instructions for causing a computer comprising one or more processors to perform steps comprising:

generating a hierarchy of features, for a plurality of features of an image document derived from a document, based on relative spatial properties of the plurality of features;

segmenting the image document into a plurality of semantic segments based on the hierarchy of features, wherein segmenting the image document comprises:

deriving semantic information for each of the plurality of semantic segments by correlating higher level information with lower level information associated with the hierarchy of features, wherein the higher level information includes combination of one or more individual features selected from a group consisting of: number of horizontal lines between two regions of text, number of vertical lines between the two regions of text, and spacing between any two texts, and wherein the lower level information Includes lines, number of pixels, edges, and background color gradient in the image document;

classifying each of the plurality of semantic segments into a plurality of tabular structures based on structural properties of each target semantic segment along with one or more neighboring semantic segments that provide a meaningful contextual information with respect to that target segment; and effecting at least one of a detection or an extraction of tabular data from the image document based on the classification.

16. The non-transitory computer-readable medium of claim 15, wherein segmenting the image document further comprises segmenting the image document based on spatial information obtained from the hierarchy of features.

17. The non-transitory computer-readable medium of claim 15, wherein classifying each of the plurality of semantic segments further comprises classifying each of the plurality of semantic segments based on spatial information for each of the plurality of semantic segments.

* * * * *